US009915392B2

(12) United States Patent
Tortorello

(10) Patent No.: US 9,915,392 B2
(45) Date of Patent: Mar. 13, 2018

(54) INTERNAL THERMAL INSULATION FOR METAL REFLECTIVE INSULATION

(71) Applicant: Transco Products, Inc., Chicago, IL (US)

(72) Inventor: Michael Tortorello, Oak Lawn, IL (US)

(73) Assignee: Transco Products Inc., Chicago, IL (US)

( * ) Notice: Subject to any disclaimer, the term of this patent is extended or adjusted under 35 U.S.C. 154(b) by 286 days.

(21) Appl. No.: 14/587,775

(22) Filed: Dec. 31, 2014

(65) Prior Publication Data

US 2015/0260330 A1    Sep. 17, 2015

Related U.S. Application Data

(60) Provisional application No. 61/952,501, filed on Mar. 13, 2014.

(51) Int. Cl.
| | |
|---|---|
| *F16L 59/02* | (2006.01) |
| *B32B 15/01* | (2006.01) |
| *B32B 3/30* | (2006.01) |
| *F16L 59/08* | (2006.01) |

(52) U.S. Cl.
CPC .............. *F16L 59/029* (2013.01); *B32B 3/30* (2013.01); *B32B 15/01* (2013.01); *F16L 59/08* (2013.01); *B32B 2307/102* (2013.01); *B32B 2307/302* (2013.01); *B32B 2307/304* (2013.01); *Y10T 428/12396* (2015.01)

(58) Field of Classification Search
CPC .... E04C 2/3405; E04C 2/3411; E04C 2/3472; E04C 2/326; E04C 2002/3483; E04C 2002/3411; E04C 2002/3472; Y10T 428/12417; Y10T 428/1234; B32B 3/30; F16L 59/029; E04B 1/78
See application file for complete search history.

(56) References Cited

U.S. PATENT DOCUMENTS

| | | |
|---|---|---|
| 1,934,174 A | 11/1933 | Dyckerhoff |
| 3,190,412 A * | 6/1965 | Rutter .................... B65D 81/38 428/119 |
| 4,251,598 A | 2/1981 | Waite |
| 5,011,743 A | 4/1991 | Sheridan et al. |
| 5,763,857 A | 6/1998 | Klement et al. |
| 5,981,082 A | 11/1999 | Pirchl |
| 6,586,111 B2 | 7/2003 | Ragland et al. |
| 2002/0098316 A1 | 7/2002 | Butler |

* cited by examiner

*Primary Examiner* — Adam Krupicka
(74) *Attorney, Agent, or Firm* — Greensfelder, Hemker & Gale, P.C.; Joseph A. Fuchs

(57) ABSTRACT

The present invention provides a preformed insulating layer having a flat web of metal foil having a plurality of spaced generally X-shaped protuberances deformed from the web. Each protuberance has a length dimension, a width dimension, and a height dimension, the length dimension and the width dimension define a ratio of from 1:1 to 4:1. A uniform gap is left around each protuberance and is from about ⅛" to about ½".

15 Claims, 5 Drawing Sheets

INTERNAL THERMAL INSULATION FOR METAL REFLECTIVE INSULATION

CROSS REFERENCE TO RELATED APPLICATIONS

This application claims priority to U.S. Provisional Patent Application No. 61/952,501 filed on Mar. 13, 2014 and is incorporated herein in its entirety by reference and made a part hereof.

FIELD OF THE INVENTION

The present invention provides a foil for forming metal reflective insulation structures and more preferably a foil having a plurality of spaced protuberances that can be stacked one on top of the other to form a multi-foil structure that addresses each of three heat transfer modes (conduction, radiation and convection) while maintaining sufficient flexibility to be bent around small diameter objects.

BACKGROUND OF THE INVENTION

Multilayer metal foil insulation has been used for many years, as illustrated by U.S. Pat. No. 1,934,174. Such metal foil insulation has typically been used in high temperature applications for reflective heat insulation. In those applications, the layers of metal foils are embossed to provide separation between the layers, and the stack of layers are protected in a container or rigid cover to prevent the stack of metal foils from becoming compressed at any portion, which would decrease the heat insulation value of the stack.

U.S. Pat. No. 4,251,598 discloses a reflective insulative panel having numerous layers such as an outer facing sheet encapsulating numerous cellular foil sheets. The layers are made from aluminum or stainless steel and are preformed with triangular-shaped ribs extending at right angles to each other throughout the length of the material and when stacked form closed cells that trap air to prevent heat loss due to convection.

U.S. Pat. No. 5,011,743 discloses that multilayer metal foil insulation can provide enhanced performance as a heat shield when a portion of the multilayer metal foil is compressed to provide a heat sink area through which heat is collected from the insulating portions of the stack and dissipated from the heat shield. Such multilayer metal foil heat shields are formed from a stack of embossed metal foil layers by compressing portions of the stack to create the desired heat sink areas. The layers are attached to each other or stapled together to prevent the layers from separating.

U.S. Pat. No. 5,763,857 discloses a heating appliance with a metal foil insulating jacket comprising air tight chambers.

U.S. Pat. No. 6,586,111 discloses multilayer metal foil insulating panels having a layered structures of at least two corrugated metal layers separated by an intermediate layer of a non-corrugated, generally flat metal foil layer.

U.S. Patent Publication No. 2002/0098316 A1 discloses a multilayer foil insulating structure for dissipating heat and attenuating sound. In one embodiment, a retainer layer composed of expanded metal sheet stock 0.050 inches thick is used to form an insulation structure with other foil layers. Apertures in the expanded metal sheet allow for the passage of sound and air.

SUMMARY OF THE INVENTION

The present invention provides a preformed insulating layer having a flat web of metal foil having a plurality of spaced, generally X-shaped protuberances deformed from the web. Each protuberance has a length dimension, a width dimension, and a height dimension, the length dimension and the width dimension define a ratio of from 1:1 to 4:1. A uniform gap is left around each protuberance and is from about 1/8" to about 1/2".

The present invention provides a preformed insulating layer having a flat web of metal foil having a plurality of spaced, generally X-shaped protuberances deformed from the web. Each protuberance has two arms that intersect at an intermediate portion of each arm to form a first acute angle between a first portion of the two arms, a second obtuse angle between a second portion of each arm, the first acute angle being between 65 degrees to 75 degrees and the second obtuse angle being supplementary to the first angle. Each protuberance has a length dimension, a width dimension and a height dimension, a ratio of the length dimension to the width dimension is about 3:2.

The present invention further provides insulating panel having a first panel of a first flat web of metal foil having a plurality of spaced, generally X-shaped protuberances deformed from the web. Each protuberance has a length dimension, a width dimension, and a height dimension, the length dimension and the width dimension define a ratio of from 1:1 to 4:1. A uniform gap is left around each protuberance and is from about 1/8" to about 1/2". The insulating panel also has a second panel stacked on top of the first panel, the second panel having a second flat web of metal foil having a plurality of spaced, generally X-shaped protuberances deformed from the second web. Each protuberance has a length dimension, a width dimension, and a height dimension, the length dimension and the width dimension define a ratio of from 1:1 to 4:1. A uniform gap is left around each protuberance and is from about 1/8" to about 1/2".

The present invention further provides an insulating panel having a plurality of layers stacked on top of one another with peripheral portions being in registration and having alternating odd numbered layers and even numbered layers. Each layer having a flat web of metal foil with a plurality of spaced, generally X-shaped protuberances deformed from the web. Each protuberance has a length dimension, a width dimension, and a height dimension, the length dimension and the width dimension define a ratio of from 1:1 to 4:1. A uniform gap is left around each protuberance and is from about 1/8" to about 1/2". The length dimension of the odd numbered panels extends along a first direction and the length dimension of the even numbered panels extends along a second direction 90° to the first direction.

The present invention further provides an insulating panel having a plurality of textured layers stacked on top of one another with peripheral portions being in registration with alternating odd-numbered layers and even-numbered layers. Each layer having a flat web of metal foil with a plurality of spaced, generally X-shaped protuberances deformed from the web. Each protuberance has a length dimension, a width dimension, and a height dimension, the length dimension and the width dimension define a ratio of from 1:1 to 4:1. A uniform gap is left around each protuberance and is from about 1/8" to about 1/2". The length dimension of the odd-numbered panels extends along a first direction and the length dimension of the even-numbered panels extends along a second direction 90° to the first direction. The panel further has an inner stainless steel sheet material of approximately 22 gauge in thickness forms an inner wall which protects the foil stack from puncture and compression. A pair of end caps encapsulate opposite ends of the cover layer and the stack to maintain the structure with the individual layers in surface contact with one another and to prevent relative movement of one layer with respect to another layer.

DETAILED DESCRIPTION

Figure 1:
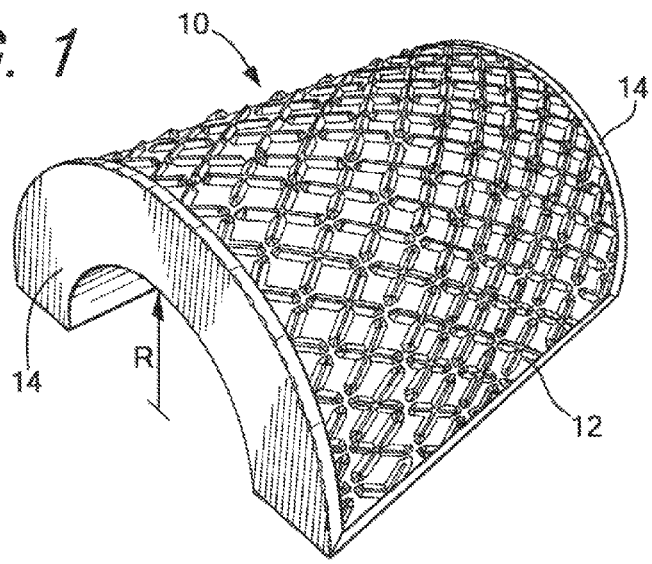
FIG. 1 is a perspective view of a heat insulation panel with end caps.

While this invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 shows a heat insulation panel structure 10 having an insulation stack 12 extending between opposed end caps 14. The insulation stack 12 has a plurality of foil layers 16 stacked on top of one another in registration with their ends received within a channel of the end caps to maintain adjacent foil layers in surface contact with one another and to prevent relative movement of the layers. The panel structure 10 is arcuate in cross-sectional dimension having a radius R for conforming to a similarly shaped object such as a pipe. The panel structure can also have a cover panel (not shown) or two cover panels extending between the end caps and encapsulating the insulation stack.

Figure 2:
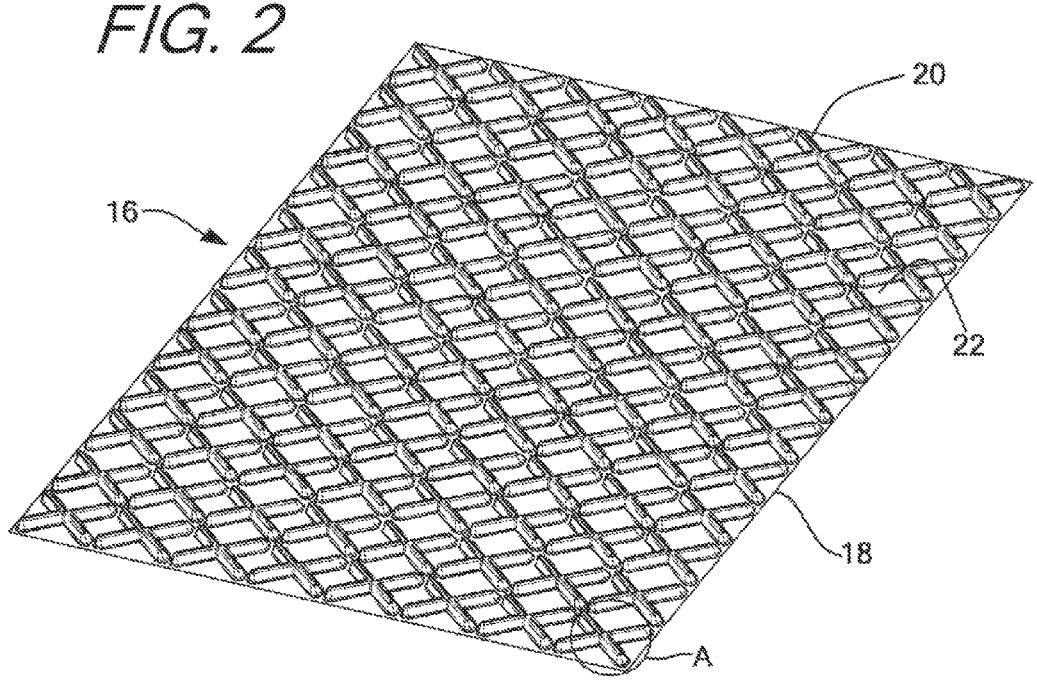
FIG. 2 is a perspective view of a layer of foil preformed to provide a plurality of spaced protuberances.

FIG. 2 shows a single foil layer 16 having a flat web of material 18 from which a plurality of generally X-shaped protuberances 20 are deformed or impressed through a process such as embossing. The protuberances 20 are spaced from one another across the entire dimension of the layer 16 to form air pockets 22 therebetween and have two arms 24 that intersect at intermediate portions of each arm.

Figure 3B:
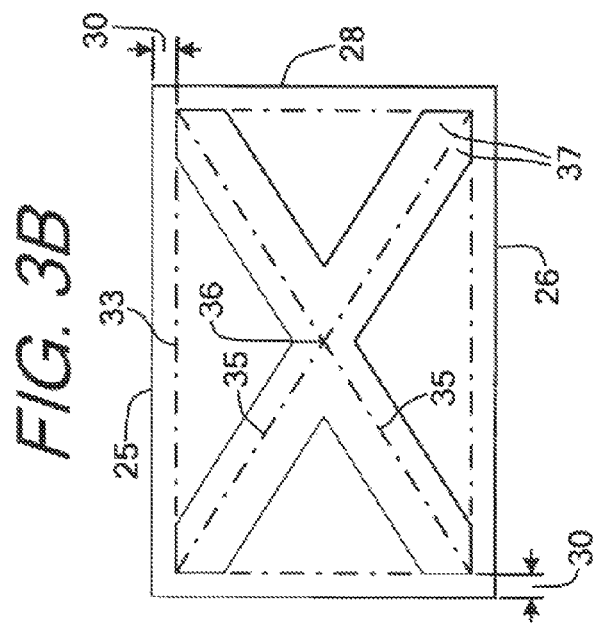
FIG. 3B is a plan view of a single protuberance of FIG. 3A.
Figure 3A:
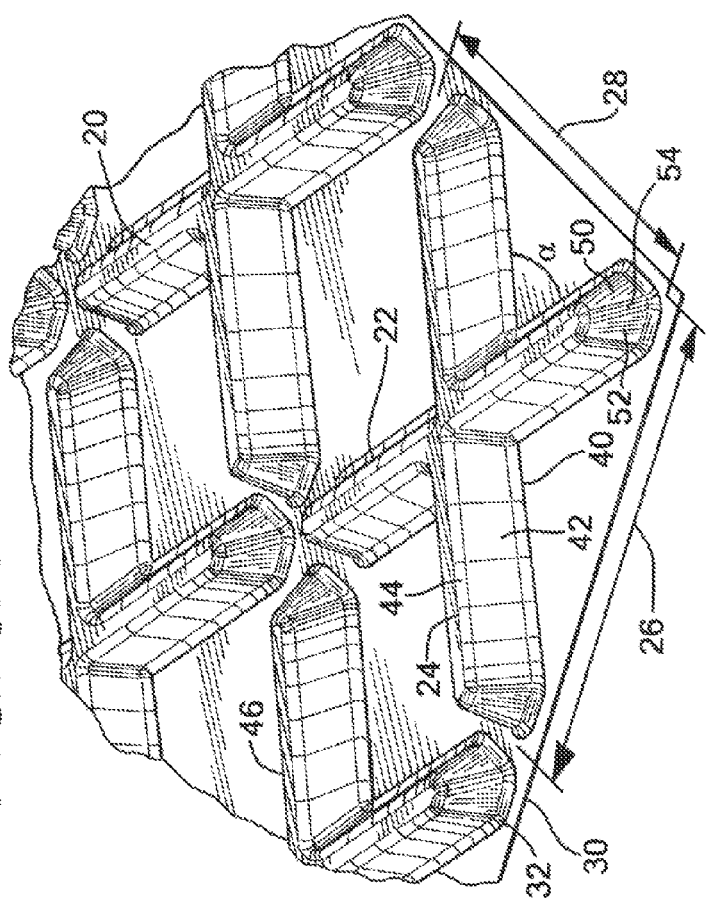
FIG. 3A is an enlarged view of a Section A of the layer of foil of FIG. 2.

FIGS. 3A, B show each protuberance 20 has a length dimension, a width dimension, and a height dimension. The aspect ratio of the protuberance is defined by an outer rectangular bounding area 25 that has a length dimension 26 and a width dimension 28 with a ratio of from 1:1 to 4:1 and most preferably a ratio of 3:2. Within the outer bounding area 25, a uniform gap 30 is left around each protuberance. The uniform gap is typically between 1/8" to 1/2" and most preferably is 1/8". The uniform gap 30 around each protuberance 20 allows each individual protuberance to terminate into the base material foil sheet thereby creating an individual air pocket 22. The presence of multiple individual air pockets on a given sheet of foil inhibits convection currents in between foil layers and improves the thermal insulating properties of the system. The uniform gap 30 surrounding each protuberance serves an additional purpose in that it provides a flat surface area to allow for bending of the larger foil sheet containing an array of protuberances. If the uniform gap around each protuberance did not exist the protuberances would connect together into a single uniform lattice pattern. The uniform gaps allow the foil sheet to easily bend around radii. The ability to easily bend the foil sheets is critical in order to easily install the foil sheets around duct work, piping, and equipment sections that have curvature. The exact dimensions of the X-shaped protuberance can vary from the currently designed 2"×3" embodiment. Decreasing the overall dimensions of the outer rectangular bounding area 25 will decrease the minimum bend radius around which a foil sheet containing an array of protuberances can bend. A negative trade off associated with decreasing the overall size of the outer rectangular bounding area 25 is that a larger blank, (more material), is required in order to form a foil sheet composed of an array of protuberances compared to the blank size required to form a foil sheet with an array of protuberances with a larger rectangular bounding area. More material is required in order to bend and stretch the material over the additional peaks and valleys generated with the smaller X-shaped pattern which is a by-product of utilizing a smaller outer rectangular bounding area.

The geometry of each X-shaped protuberance is defined by a rectangular inner bounding area 33 which is offset from the outer rectangular bounding area 25 by the uniform gap 30. The X-shape is confined by two center lines 35 drawn diagonally to connect opposing corners of the inner bounding area 33. The center lines intersect 35 at their respective midpoints 36 to form an acute angle and an obtuse angle supplementary to the acute angle. The acute angle a is from about 65 degrees to 75 degrees and most preferably about 65 degrees. Each arm 24 is of uniform width typically between 1/8" and 3/4", preferably around 0.4". The lines defining the interior legs of the X-Shape are parallel to center line running in between them. The X-shape is further defined such that the length of the corner line segments 37 that intersect with the inner rectangular bounding area are all of equal length.

Figure 4:
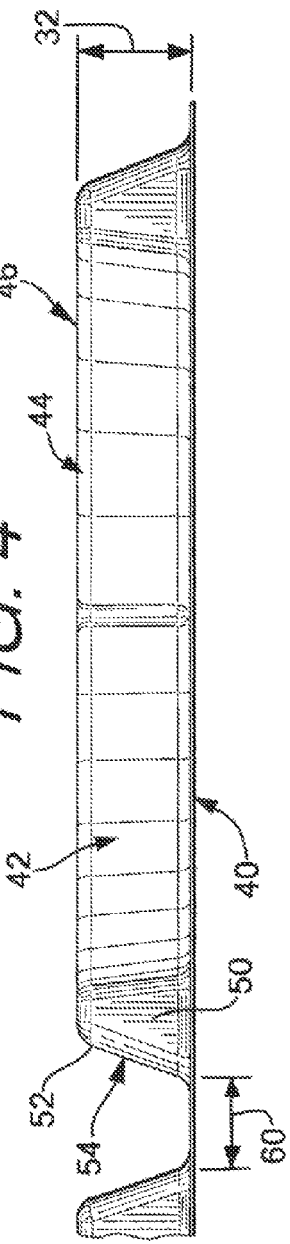
FIG. 4 is a side elevation view of a protuberance of FIG. 2.

FIG. 4 shows a height dimension 32 of each protuberance which is from about 0.10 inches to about 0.75 inches, more preferably from about 0.20 to about 0.5 inches, even more preferably from about 0.25 inches to about 0.35 inches and most preferably about 0.33 inches. The thickness of the web of material 18 is, in a preferred form of the invention, from about 0.0015 inches to about 0.010 inches and more preferably about 0.0020 inches. Each arm of the protuberance has a base 40, a face 42, a transition 44 and a top 46. The distal-most ends of the protuberances have a first end panel 50, a second end panel 52 and a post 54 connecting the first and second end panels. The face 42 tapers upwardly and inwardly of the arm from the base 40 to the transition 44 to form a top portion more narrow than the base portion and at an angle to a vertical line from 0 degrees to about 45 degrees and most preferably is about 20°. It is contemplated that the face 42, transition 44 and the top could be replaced with flat walls or with walls that are generally rounded along portions of their length without departing from the scope of the present invention.

The first and second end panels 50, 52 taper radially inwardly toward one another at an angle to a horizontal axis running through the center of the arms with the angles being equal in magnitude but on opposite sides of the axis. Thus, the distal most ends of the arms have a tapered end portion having a smaller width than the width of the intermediate portions of the arms. The first and second end panels 50, 52 and the post 54 have outer surfaces that taper inwardly of the arm from the base to the transition at an angle to the vertical axis within the same range set forth above for the face 42, but do not necessarily have to be the same angle as the face. It is contemplated that the end panels 50, 52 and the post 54 could be replaced with a rounded end without departing from the scope of the present invention.

As best shown in FIGS. 3B and 4, in a preferred form of the invention, there is a gap 60 between a distal-most end portion 32 of each adjacent arm from about 0.125 inches to about 0.50 inches and more preferably from about 0.22 inches to about 0.28 inches and most preferably about 0.25 inches.

Figure 5:
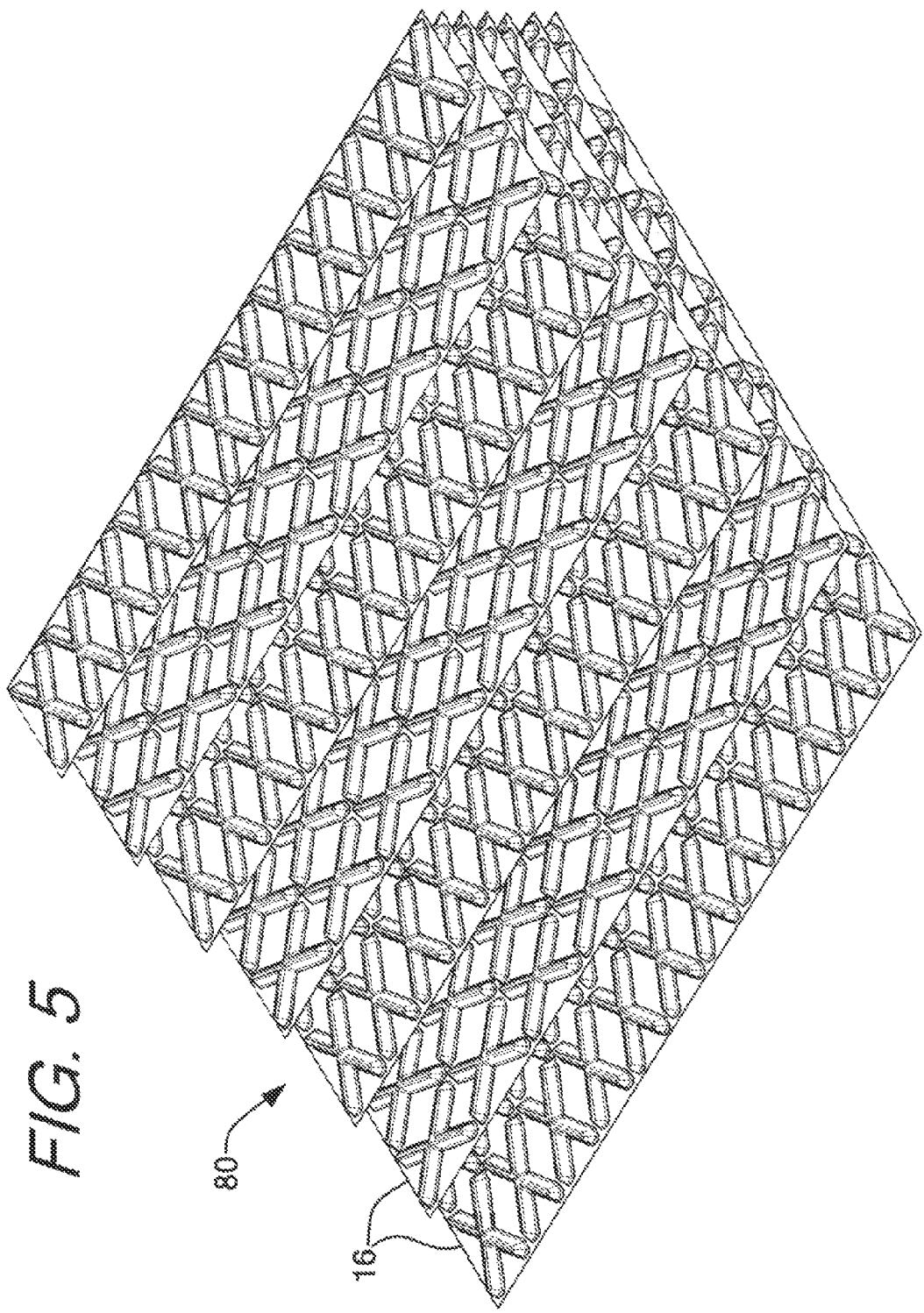
FIG. 5 is an isometric view of a stack of layers of foil with a stair-step cross-sectional cut.
Figure 6:
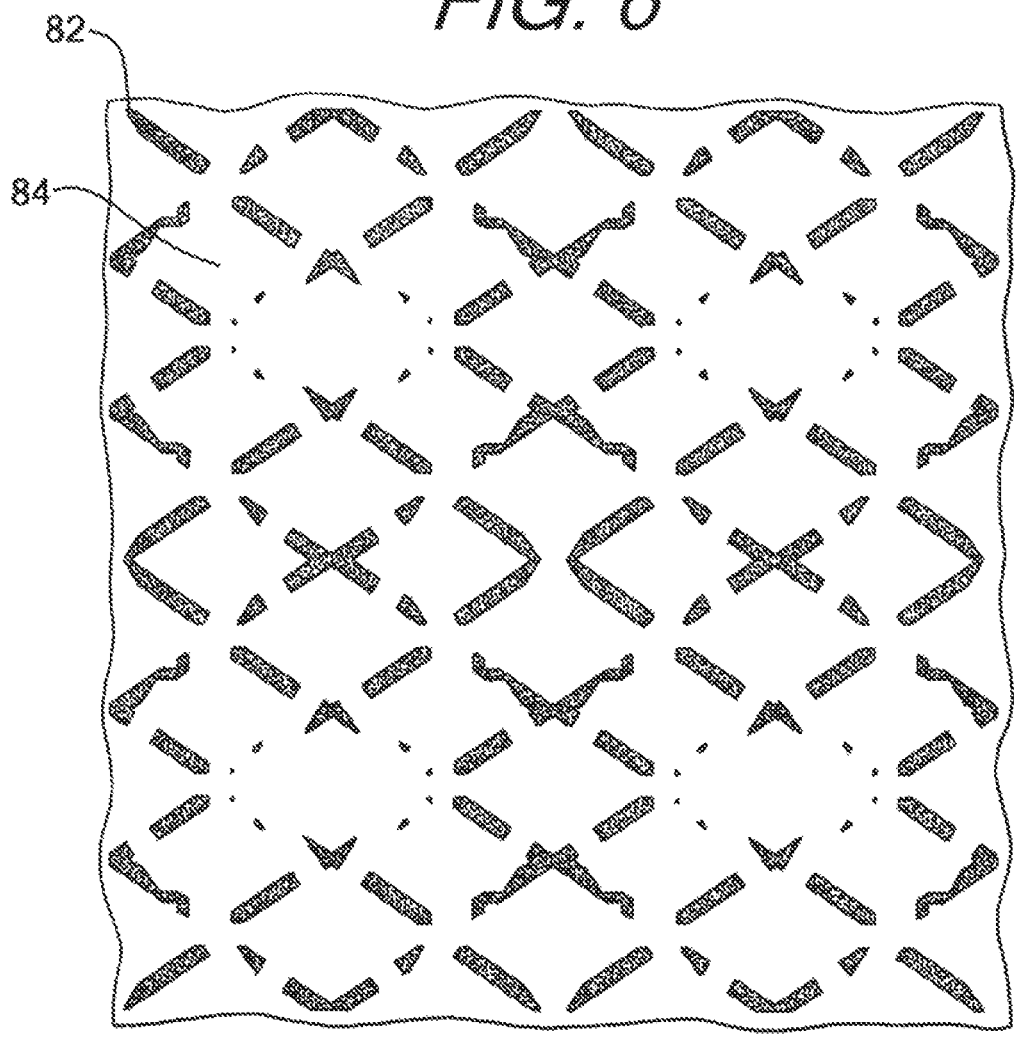
FIG. 6 is a plan view of an image showing points of material contact between two adjacent foil layers.

FIG. 5 shows a stack 80 of seven textured foil layers 16, for example, with every other layer rotated at 90°. While seven layers are shown it should be understood that the stack could have from, say,2 to 10 textured layers with odd-numbered layers having the length dimension of the X-shaped protuberances extending along a first direction and the even-numbered layers having the length dimension extending along a second direction oriented at about 90° to the first direction. FIG. 6 shows the points of material contact 82 and air spaces 84 between adjacent foil layers 16. By rotating the layers, the contact area is minimized as shown by the large air spaces 84.

Figure 7:
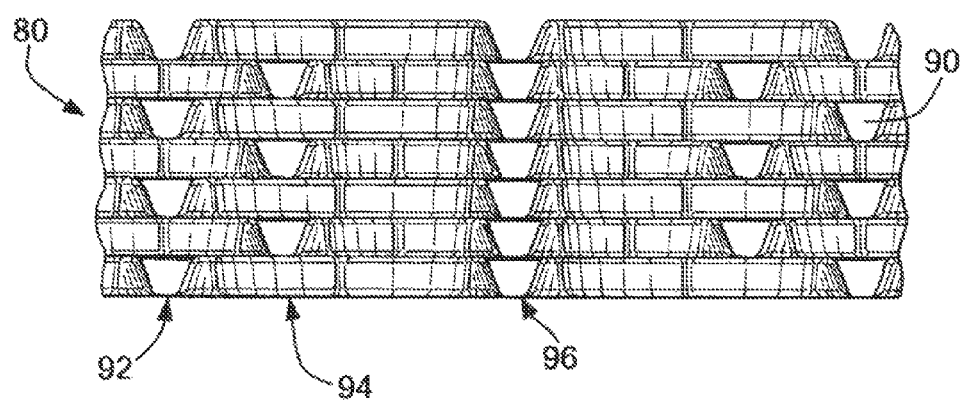
FIG. 7 is a side elevation view of a stack of foils from a first direction.
Figure 8:
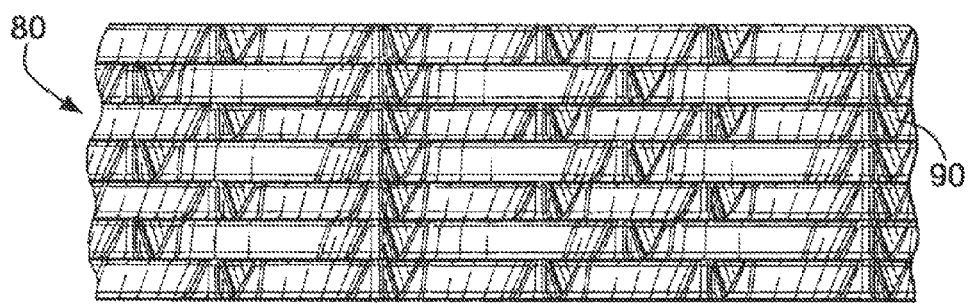
FIG. 8 is a side elevation view of the same stack as shown in FIG. 7 but from a second direction 45° from the first direction.

FIG. 7 shows an end view along a line perpendicular to an edge of the stack 80 showing air channels 90 that extend along the perpendicular line through the stack. Three air channels in odd number layers and in even numbered layers form, respectively, vertical columns 92, 94. Similarly, seven air channels align in all layers to form a vertical column 96. The vertical columns allow the stack 80 to flex to conform to piping and the contours of equipment. FIG. 8 shows a side view of the stack rotated 45° and there are no air channels present.

The X-shaped pattern reduces convection with the air compartments 84 formed among adjacent protuberances. Heat conductance is addressed by rotating the layers by 90 degrees every other layer to reduce the contact area between layers thereby reducing conduction between layers and to reduce the tendency of nesting between adjacent layers. Heat radiation through the stack is minimized by reflection of heat by the large flat areas 22 between the protuberances. Thus, each heat transfer mechanism is addressed through the individual foil 16 and the stack of the foils.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims. The appended claims should be construed broadly and in a manner consistent with the spirit and the scope of the invention herein.

I claim:

1. A preformed insulating layer comprising a flat web of metal foil having a plurality of spaced generally X-shaped protuberances deformed from the web having two arms intersecting at an intermediate portion of each arm, each protuberance has a length dimension, a width dimension, and a height dimension, the length dimension and the width dimension define a ratio of from 1:1 to 4:1, a uniform gap is left around each protuberance and is from about ⅛" to about ½", each arm has an end portion having a width smaller than a width
of the arm at an intermediate portion, wherein the end portion has a first end panel and a second end panel tapering toward each other inward of the arm.

2. The insulating layer of claim 1 wherein each arm has a base, a top and a face connecting the base to the top, the face tapering inwardly of the arm from the base to the top to form a first angle with a vertical axis, the first angle being from about 0 degrees to about 45 degrees.

3. The insulating layer of claim 1 wherein the first end panel has a surface that tapers inwardly of the arm from a base portion to a top portion and forms a second angle with a vertical axis from about 0 degrees to about 45 degrees.

4. The insulating layer of claim 1 wherein a distance between an end portion of one arm on a first protuberance to a second arm on a second protuberance is from about 0.125 inches to about 0.5 inches.

5. A preformed insulating layer comprising a flat web of metal foil having a plurality of spaced generally X-shaped protuberances deformed from the web, each protuberance having two arms that intersect at an intermediate portion of each arm to form a first acute angle between a first portion of each arm, a second obtuse angle between a second portion of each arm, the first acute angle being between 65 degrees to 75 degrees and the second obtuse angle being supplementary to the first angle, each protuberance has a length dimension, a width dimension and a height dimension, a ratio of the length dimension to the width dimension is about 3:2, each arm has an end portion having a width smaller than a width of the arm at an intermediate portion, the end portion has a first end panel and a second end panel tapering toward each other inward of the arm.

6. An insulating panel comprising:
a first panel of a first flat web of metal foil having a plurality of spaced generally X-shaped protuberances deformed from the web having two arms intersecting at an intermediate portion of each arm, each protuberance has a length dimension, a width dimension, and a height dimension, the length dimension and the width dimension define a ratio of from 1:1 to 4:1, a uniform gap is left around each protuberance and is from about ⅛" to about ½", each arm has an end portion having a width smaller than a width of the arm at an intermediate portion, the end portion has a first end panel and a second end panel tapering toward each other inward of the arm; and
a second panel stacked on top of the first panel, the second panel having a second flat web of metal foil having a plurality of spaced generally X-shaped protuberances deformed from the second web having two arms intersecting at an intermediate portion of each arm, each protuberance has a length dimension, a width dimension, and a height dimension, the length dimension and the width dimension define a ratio of from 1:1 to 4:1, a uniform gap is left around each protuberance and is from about ⅛" to about ½", each arm has an end portion having a width smaller than a width of the arm at an intermediate portion.

7. An insulating panel comprising:
a plurality of textured layers stacked on top of one another with peripheral portions being in registration to form a layered structure with alternating odd-numbered layers and even-numbered layers, each layer having a flat web of metal foil having a plurality of spaced generally X-shaped protuberances deformed from the web having two arms intersecting at an intermediate portion of each arm, each protuberance has a length dimension, a width dimension, and a heightdimension, the length dimension and the width dimension define a ratio of from 1:1 to 4:1, a uniform gap is left around each protuberance and is from about ⅛" to about ½", each arm has an end portion having a width smaller than a width of the arm at an intermediate portion, the end portion has a first end panel and a second end panel tapering toward each other inward of the arm, the length dimension of the odd-numbered layers extends along a first direction and the length dimension of the even-numbered layers extends along a second direction 90° to the first direction.

8. The insulating panel of claim 7 wherein the plurality of layers is from 2 layers to 10 layers.

9. The insulating panel of claim 7 wherein each arm has a base, a top and a face connecting the base to the top, the face tapering inwardly of the arm from the base to the top to form a first angle with a vertical axis, the first angle being from about 0 degrees to about 45 degrees.

10. The insulating panel of claim 7 wherein the first end panel has a surface that tapers inwardly of the arm from a base portion to a top portion and forms a second angle with a vertical axis from about 0 degrees to about 45 degrees.

11. The insulating panel of claim 7 wherein each of the arms have an end portion and a distance between an end portion of one arm on a first protuberance to a second arm on a second protuberance is from about 0.125 inches to about 0.5 inches.

12. An insulating panel comprising:
a plurality of textured layers stacked on top of one another with peripheral portions being in registration with alternating odd-numbered layers and even-numbered layers, each layer having a flat web of metal foil having a plurality of spaced generally X-shaped protuberances deformed from the web having two arms intersecting at an intermediate portion of each arm, each protuberance has a length dimension, a width dimension, and a height dimension, the length dimension and the width dimension define a ratio of from 1:1 to 4:1, a uniform gap is left aroundeach protuberance and is from about ⅛" to about ½", each arm has an end portion having a width smaller than a width of the arm at an intermediate portion, the end portion has a first end panel and a second end panel tapering toward each other inward of the arm, the length dimension of the odd-numbered layers extends along a first direction and the length dimension of the even-numbered layers extends along a second direction 90° to the first direction;
a first cover foil layer placed on top of the stack of textured layers and having peripheral edges in registration with the stack; and
a pair of end caps encapsulating opposite ends of the cover layer and the stack of textured layers to maintain the individual layers in surface contact with one another and to prevent relative movement of one layer with respect to another layer.

13. The insulating panel of claim 12 further comprising a second cover foil on a bottom of the stack to encapsulate the plurality of textured layers between the first and second cover foils.

14. The insulating panel of claim 12 having an arcuate profile in cross-sectional dimension.

15. The insulating panel of claim 12 wherein each arm has a base, a top and a face connecting the base to the top, the face tapering inwardly of the arm from the base to the top to form an angle with a vertical axis, the angle being from about 0 degrees to about 45 degrees.

\* \* \* \* \*

UNITED STATES PATENT AND TRADEMARK OFFICE
CERTIFICATE OF CORRECTION

PATENT NO. : 9,915,392 B2  
APPLICATION NO. : 14/587775  
DATED : March 13, 2018  
INVENTOR(S) : Michael Tortorello Page 1 of 1

It is certified that error appears in the above-identified patent and that said Letters Patent is hereby corrected as shown below:

In the Claims

In Claim 1, at Column 6, Line 1, delete "isfrom" and insert --is from--

In Claim 7, at Column 7, Line 3, delete "heightdimension" and insert --height dimension--

In Claim 12, at Column 8, Line 7, delete "aroundeach" and insert --around each--

Signed and Sealed this
Twenty-seventh Day of November, 2018

Andrei Iancu
*Director of the United States Patent and Trademark Office*